(12) United States Patent
Mei

(10) Patent No.: US 11,868,016 B2
(45) Date of Patent: Jan. 9, 2024

(54) LIGHT-EMITTING ELECTROCHROMIC DEVICE

(71) Applicant: AMBILIGHT INC., Milpitas, CA (US)

(72) Inventor: Jianguo Mei, West Lafayette, IN (US)

(73) Assignee: AMBILIGHT INC., Milpitas, CA (US)

( * ) Notice: Subject to any disclaimer, the term of this patent is extended or adjusted under 35 U.S.C. 154(b) by 0 days.

(21) Appl. No.: 17/714,398

(22) Filed: Apr. 6, 2022

(65) Prior Publication Data

US 2022/0334443 A1 Oct. 20, 2022

Related U.S. Application Data

(60) Provisional application No. 63/175,461, filed on Apr. 15, 2021.

(51) Int. Cl.
| | | |
|---|---|---|
| *G02F 1/1516* | (2019.01) | |
| *G02F 1/13357* | (2006.01) | |
| *G02F 1/137* | (2006.01) | |
| *G02F 1/155* | (2006.01) | |
| *G02F 1/15* | (2019.01) | |

(52) U.S. Cl.
CPC ......... *G02F 1/15165* (2019.01); *G02F 1/137* (2013.01); *G02F 1/133617* (2013.01); *G02F 1/15* (2013.01); *G02F 1/155* (2013.01)

(58) Field of Classification Search
CPC ......... G02F 1/133614; G02F 1/133617; G02F 1/15165
See application file for complete search history.

(56) References Cited

U.S. PATENT DOCUMENTS

| | | | | |
|---|---|---|---|---|
| 2013/0141916 A1* | 6/2013 | Kobayashi | ............ | G02F 1/1503 359/266 |
| 2018/0373108 A1* | 12/2018 | Kang | ............ | B32B 27/285 |
| 2021/0333677 A1* | 10/2021 | Wang | ............ | C09K 11/06 |

FOREIGN PATENT DOCUMENTS

CN 112250842 A * 1/2021 ............. C08G 61/12

* cited by examiner

*Primary Examiner* — Alexander P Gross

(57) ABSTRACT

A light-emitting electrochromic device with both electrochromic properties and light-emitting properties is disclosed. The light-emitting electrochromic device also shows multiple color-switching properties.

9 Claims, 1 Drawing Sheet

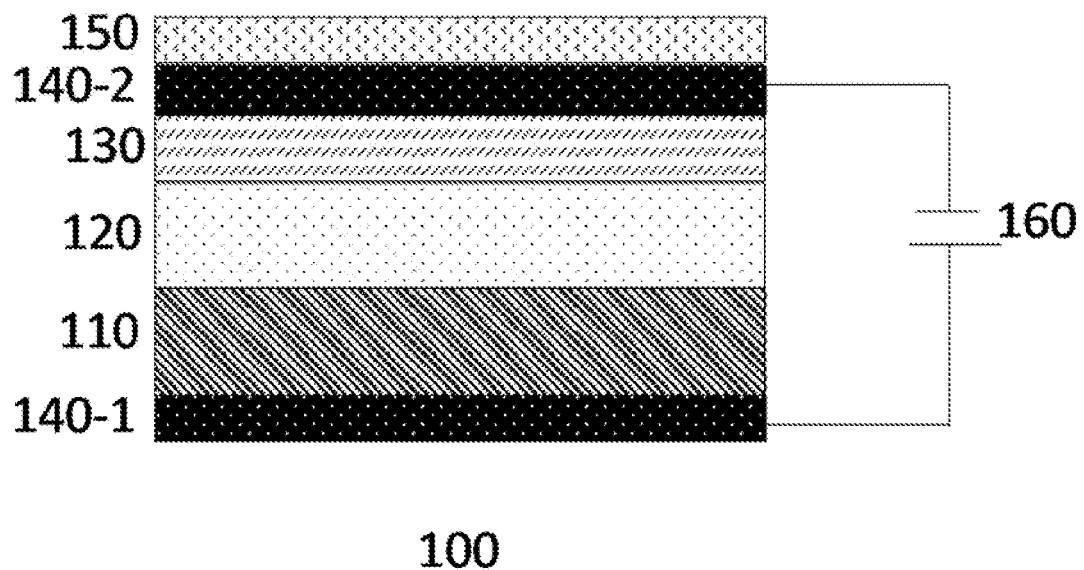

LIGHT-EMITTING ELECTROCHROMIC DEVICE

REFERENCE TO RELATED APPLICATIONS

The present application claims priority to U.S. Provisional Application No. 63/175,461 filed on Apr. 15, 2021. The entire content of the above-referenced application is incorporated herein by reference.

TECHNICAL FIELD

The present disclosure is generally related to a light-emitting electrochromic device. More particularly, a light-emitting electrochromic device with multifunctional color-switching properties and methods to prepare the disclosed electrochromic device.

BACKGROUND

Electrochromic devices have recently drawn significant interest in various applications, such as display, information storage, windows. Electrochromic devices with various functionalities and multiple features to expand their applications have been under intensive investigation. But as to our knowledge, a light-emitting electrochromic device with multifunctional color-switching properties has not been explored so far.

SUMMARY

Described herein is a light-emitting electrochromic device (ECD) with multifunctional color-switching properties and methods to prepare the disclosed electrochromic device.

The disclosed light emitting ECD comprises a first transparent electrode, an electrochromic layer, an electrolyte layer, an ion storage layer, and a second transparent electrode. The electrochromic layer includes at least one electrochromic material that generates a subtractive color and switches from a colored state to a transmissive bleached state, at least one light-emissive materials are included in the disclosed ECD, generate an additive color, and emit light when the electrochromic material is either in the colored state or in the bleached state or both of the colored state and in the bleached state, the electrochromic material and the light-emissive materials produce a color mixing, and the light-emitting ECD further comprises a multiple light switching mechanism. The multiple light switching mechanism comprises an electrochromic color switching of the electrochromic material between the colored state and the bleached state, an on-switching of an emissive color triggered by excitation sources of the light-emissive materials, and an off-switching of at least one emissive color controlled by quenching the at least one light-emissive material. Each of the light switching mechanisms produces a noticeable color difference either detectable by a fluorometer or by naked eyes or by both when switching.

The emissive colors from light-emissive material are fluorescent or phosphorescent.

The emissive color on-switching comprises on-switching triggered by ambient light or an electrical field.

The light-emissive material is mixed with at least one of the EC material, or an electrolyte material of the electrolyte layer, or an ion storage material of the ion storage layer and disposed between the first transparent electrode and the second transparent electrode, or disposed externally to space between the first transparent electrode and the second transparent electrode.

The electrochromic material comprises an electrochromic polymer. In some embodiments, the light-emissive material is incorporated onto the electrochromic polymer by a non-conjugated bond.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings below. For the purpose of illustrating the invention, the drawings show aspects of one or more embodiments of the invention. However, it should be understood that the present invention is not limited to the precise arrangements and instrumentalities shown in the drawings.

FIG. 1 is an example block diagram illustrating an example of all solid ECD with the light-emitting materials deposited externally to space between the first transparent electrode and the second transparent electrode, according to one example embodiment.

DETAILED DESCRIPTION OF EMBODIMENTS

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but maybe in some instances. Furthermore, the particular features, structures, or characteristics may be combined in any suitable manner in one or more embodiments.

Various embodiments described herein are directed to a light-emitting electrochromic device (ECD) with multifunctional color-switching properties and methods to prepare the disclosed electrochromic device.

The disclosed light-emitting ECD comprises a first transparent electrode, an electrochromic layer, an electrolyte layer, an ion storage layer, and a second transparent electrode. The electrochromic layer includes at least one electrochromic material that generate a subtractive color and switch from a colored state to a transmissive bleached state. At least one light-emissive material is included in the disclosed light-emitting ECD, generate an additive color, and emit light when the electrochromic material is either in the colored state or in the bleached state or both of the colored state and in the bleached state, the electrochromic material and the light-emissive materials produce a color mixing, and the light-emitting ECD further comprises a multiple light switching mechanism. The multiple light switching mechanism comprises an electrochromic color switching of the electrochromic material between the colored state and the bleached state, an on-switching of an emissive color triggered by excitation sources of the light-emissive materials, and an off-switching of at least one emissive color controlled by quenching the at least one the light-emissive material. Those multiple color-switching mechanisms work together to produce various noticeable colors either detectable by a fluorometer or by naked eyes or by both.

At least one light-emissive materials are included in the disclosed ECD. In some embodiments, only one light-emissive material is included in the disclosed ECD. In some embodiments, multiple light-emissive materials are included in the disclosed ECD, with each light-emissive material included in the same layer or in different layers or external of space between two electrodes. For different applications, for example, for different display effects, the emissive colors might be controlled to be switched off simultaneously or separately or not be switched off at all.

The subtractive color and the additive color are the results of at least one light mode, for example, including reflective light, transmissive light, transflective light, and emissive color. In some embodiments, the subtractive color from the EC materials is the result of reflective light when the viewing point is at the same side as the light source. In some embodiments, the subtractive color from the EC materials is the result of transflective color when the viewing point is at the opposite side with the light source. The additive color is from the light-emissive material. In some embodiments, the additive color is the result of only the emissive color when the light-emissive materials appear pale without activation, for example, pyrene and quinine. In some embodiments, the additive color is the result of both reflective/transflective light and emissive color, for example, fluorescein, Nile red, and Nile blue.

By selecting appropriate electrochromic materials and light-emissive materials, the disclosed light-emitting ECDs display multiple layers of information. By adjusting both the emissive color on-switching and the emissive color off-switching, various emissive color intensities can be controlled and adjusted. The intensity differences of emissive color are either big enough to be noticed by naked eyes, or minimal, which can only be detected by a fluorometer, or both. Overall, the disclosed light emitting ECDs also provide multifunctional color-switching properties. These light-emitting ECDs with multifunctional color-switching can be used in various applications, such as display, wearable medical device, sensor, anti-counterfeiting technology, or information storage.

The emissive colors from light-emissive material are fluorescent or phosphorescent. In some embodiments, the emissive colors are fluorescent colors that only present with the presence of excitation sources. In some embodiments, the emissive colors are phosphorescent colors which last even the excitation sources are not presented anymore.

At least one light-emissive material is included in the disclosed ECD. The emissive color on-switching is triggered by various excitation sources, including external excitation sources and internal excitation sources. In some embodiments, the emissive color on-switching is triggered by external excitation sources of the disclosed ECD, which means the excitation sources come from outside of the disclosed ECD. For example, in some embodiments, the emissive color on-switching comprises on-switching triggered by an external ambient light or an electrical field. In some embodiments, the emissive color on-switching is triggered by internal excitation sources of the disclosed ECD, which means the excitation sources come from internal of the disclosed ECD. For example, in some embodiments, the emissive color on-switching is triggered by the emissive color from another light-emissive molecule nearby included in the same disclosed ECD by FRET (Förster resonance energy transfer).

The emissive color on-switching involves various excitation mechanisms, for example, chemical switching (switching on by a chemical reaction, for example, luminol emits blue light when reacting with $H_2O_2$), electric switching (switching on by an electrochemical reaction, for example, ZnS:Cu sulfide emits green light when being applied by a strong electric field), photoswitching (switching on by absorption of lights, for example, fluorescein emits green light under UV illumination), sound switching (switching on by imploding bubbles in a liquid when excited by sound, for example, concentrated sulfuric acid saturated with Ar gas generates blue light when irradiated with ultrasound), friction switching (switching on by mechanical friction, for example, diamond begin to fluoresce blue or red while being rubbed during cutting process), heat switching (switching on by heating, for example, fluorite emits blueish purple light when being heated), biological switching (switching on by biochemical reactions in a living organism, for example, Aliivibrio *fischeri* emits blue-green light from the expression of the lux operon), and aggregation-induced switching (switching on by chromophore aggregation, for example, tetraphenylethene emits bright green light upon aggregation formation). More specifically, the emissive color on-switching, for example, is triggered by ambient light or electrical field. In some embodiments, the emissive color materials are photoactivatable fluorophores switched from a non-emissive state to an emissive state upon illumination of ambient light. For example, in some embodiments, the emissive materials comprise quinine, which appears fluorescent after absorbing ambient light. In some embodiments, the emissive materials are electroluminescence materials that emit light in response to electric current or strong electric fields. For example, in some embodiments, the light-emissive materials comprise inorganic manganese-doped zinc sulfide (ZnS:Mn) nanocrystals which emit yellow-orange light when being applied with a sufficiently high voltage.

The emissive color off-switching of at least one of the emissive colors is controlled by a variety of quenching mechanisms of the emissive colors by the interaction between light-emissive molecules or between the light-emissive molecules with the other components within the electrochromic device (for example, electrochromic materials, electrolytes, and/or ion storage materials), or with the working environment. Example emissive color off-switching comprises self-quenching, FRET (Förster resonance energy transfer), electron transfer quenching, temperature quenching, specific ion quenching, water quenching, alcohol quenching. However, the quenching mechanism is complex under different operating conditions. It is possible that more than one quenching mechanism are involved. In the following embodiments, without further specification, we choose one of the major quenching mechanisms to control the intensity of the emissive color. To simplify the embodiments, only one light-emissive material is included in the following embodiments, but as noted earlier, multiple light-emissive materials may be included. For example, the light-emissive materials in the following embodiments may be combined in the same ECD. Energy transfer between different light-emissive materials may or may not present. The excitation sources for different light-emissive materials may or may not be the same.

In some embodiments, the electrochromic layer (EC layer) from the ECD comprises a p-type electrochromic polymer ECP-yellow mixed with an emissive material pyrene. The amount of pyrene is 10%. When a voltage range of −0.2V to 1.4V is applied, polymer ECP-yellow changes colors between yellow and colorless. When excited by a UV light, the disclosed ECD presents a blue fluorescent color due to pyrene. When a voltage of 1.4V is applied, ECP-yellow is oxidized, thus appears a bleached colorless state when being oxidized, presenting an electron-deficient environment within the EC layer. So, when a voltage of 1.4V is applied, the blue fluorescent color from pyrene is weakened by the electron-deficient environment within the EC layer when ECP-magenta is being oxidized. By adjusting the applied voltage on the disclosed ECD (1.2V to 1.4V), the electron-deficient degree is adjusted. Thus, the quenching degree of pyrene fluorescence is controlled. In some embodiments, pyrene is mixed with LiTFSi electrolyte material within an electrolyte layer. In some embodiments, pyrene is deposited on the external of the electrodes. In these embodiments immediately mentioned above, the quenching of the blue fluorescent color from pyrene is controlled to be insignificant.

In some embodiments, the electrochromic layer (EC layer) from the ECD comprises a p-type electrochromic polymer ECP-magenta, while the ion storage materials are an n-type ion storage material niobium oxide mixed with an emissive material rhodamine fluorophores. The amount of rhodamine fluorophores is 20%. When a voltage range of −2V to 2V is applied, ECP-magenta changes colors between purple and colorless. When excited by a UV light, the disclosed ECDs present a yellow/orange fluorescent color due to rhodamine. When a voltage of 2V is applied, ECP-magenta is oxidized, appearing a bleached colorless state when being oxidized, while vanadium oxide is being reduced, presenting an electron-deficient environment within the ion storage layer. So, when a voltage of 2V is applied, the yellow/orange fluorescent color is weakened by the electron-rich environment within the ion storage layer when vanadium oxide is being oxidized. By adjusting the applied voltage on the disclosed ECD (1V to 2V), the quenching degree of rhodamine fluorescence is controlled. In some embodiments, rhodamine is mixed with LiTFSi electrolyte material within an electrolyte layer. In some embodiments, rhodamine is deposited on the external of the electrodes. In these embodiments immediately mentioned above, the quenching of the yellow/orange fluorescent color from pyrene is controlled to be insignificant.

In some embodiments, the electrochromic layer (EC layer) from the ECD comprises a p-type electrochromic polymer ECP-magenta mixed with emissive material quinine. The amount of quinine is 0.5% by weight. The electrolyte is lithium chloride (LiCl). When a voltage range of −2V to 0.8V is applied, ECP-magenta changes colors between purple and colorless. When excited by a UV light, the disclosed ECDs present a blue fluorescent color due to quinine. When a voltage of 0.8V is applied, ECP-magenta is oxidized, appearing in a bleached colorless state when being oxidized. The chloride ions from the electrolyte LiCl diffuse into the EC layer and quench the active quinine fluorophore, thus eventually weakened the blue fluorescent. By adjusting the applied voltage, the diffusion of chloride ions can be adjusted. Thus the quenching degree of quinine fluorescence is controlled.

In some embodiments, the emissive color off-switching of at least one emissive color is controlled by adjusting the interaction between the emissive materials and the working environment, including, for example, temperature, light intensity, water, and solvents.

In some embodiments, the EC layer from the ECD comprises a p-type electrochromic polymer ECP-magenta and is paired with vanadium oxide as ion storage materials, while the light-emissive material is a temperature-sensitive material tris(bipyridine)ruthenium(II). The amount of tris(bipyridine)ruthenium(II) is 2%. Tris(bipyridine)ruthenium(II) is displaced externally of the disclosed ECDs. When a voltage range of −0.2V to 0.8V is applied, ECP-magenta changes colors between purple and colorless. When excited by a UV light, the disclosed ECDs present an orange/red fluorescent color due to tris(bipyridine)ruthenium(II). When a voltage of 0.8V is applied, ECP-magenta is oxidized, appearing a bleached colorless state when being oxidized. Since the orange/red fluorescence intensity of tris(bipyridine)ruthenium(II) decreases with the increase of environmental temperature, by adjusting the environmental temperature between 20° C. and 60° C., the orange/red fluorescence is controlled.

In some embodiments, the EC layer from the ECD comprises a p-type electrochromic polymer ECP-magenta and is paired with vanadium oxide as ion storage materials, while the light-emissive materials are water-sensitive materials fluorescent carbon quantum dots (CQDs). The amount of CQDs is 0.1% by weight. CQDs are dissolved in organic solvents and displaced externally to the two electrodes of the ECDs. When a voltage range of −0.2V to 0.8V is applied, ECP-magenta changes colors between purple and colorless. When excited by a UV light, the disclosed ECDs present a yellow fluorescent color due to CQDs. When a voltage of 0.8V is applied, ECP-magenta is oxidized, appearing in a bleached colorless state when being oxidized. Since the orange/red fluorescence intensity of CQDs is quenched by water, by adjusting the water content in the organic solvent between 0.01% to 10%, the quenching degree of the yellow fluorescence is controlled. In some embodiments, the CQDs are mixed with LiTFSi electrolyte material within an electrolyte layer. In some embodiments, the CQDs are mixed with ECP-magenta within an electrochromic layer. In some embodiments, the CQDs are mixed with ion storage material vanadium oxide in the ion storage layer. In some embodiments, the CQDs are mixed with both ECP-magenta in the electrochromic layer and LiTFSi electrolyte in the electrolyte layer. In some embodiment, the CQDs are mixed with ECP-magenta in the electrochromic layer, LiTFSi electrolyte in the electrolyte layer, and vanadium oxide in the ion storage layer.

In some embodiments, the EC layer from the ECD comprises a p-type electrochromic polymer ECP-magenta and is paired with vanadium oxide as ion storage materials, while the light-emissive materials are an aggregation-induced emissive material hexaphenylsilole (HPS). HPS is mixed with ECP-magenta and deposited into thin film and work as the working electrode. When a voltage range of −0.2V to 0.8V is applied, ECP-magenta changes colors between purple and colorless. When excited by a UV light, the disclosed ECDs present a green fluorescent color due to restricted intramolecular rotation of the closed packed HPS within EC layer thin film. When a voltage of 0.8V is applied, ECP-magenta is oxidized, appearing a bleached colorless state when being oxidized. By adjusting the close packing level within the EC layer thin film, the green fluorescence is controlled. In some embodiments, the HPS is mixed with LiTFSi electrolyte material and deposited into a thin film as the electrolyte layer. In some embodiments, the HPS is mixed with ion storage material vanadium oxide and deposited into a thin film as the ion storage layer. In some embodiments, the HPS is mixed both ECP-magenta in the electrochromic layer and LiTFSi electrolyte in the electrolyte layer. In some embodiment, the HPS is mixed with ECP-magenta in the electrochromic layer, LiTFSi electrolyte in the electrolyte layer, and vanadium oxide in the ion storage layer.

The emissive color can be either visible or invisible and be detected by a fluorometer or naked eyes or by both. In some embodiments, the light-emissive material is indium gallium nitride (InGaN), which emitted colors vary from visible violet to red depending on the GaN/InN ratio. Both naked eyes or fluorometer can detect this visible violet to red emissive color. In some embodiments, the light-emissive material is indium gallium arsenide (InGaAs), which emitted color is invisible infrared light, which can only be detected by a fluorometer.

The EC materials comprise conjugated polymers, inorganic electrochromic materials, viologen-based electrochromic materials, oligomeric electrochromic materials. The light-emissive materials comprise photoluminescent materials, thermoluminescent materials, electroluminescent materials, chemiluminescent materials, mechanoluminescent materials, radioluminescent materials, and aggregation-induced luminescent materials.

The light-emissive materials do or do not undergo redox processes within the voltage range to operate the disclosed light-emitting ECDs. In some embodiment, the light-emissive materials undergo redox processes within the voltage range to operate the disclosed light-emitting ECDs. In some embodiments, the light-emissive materials do not undergo redox processes within the voltage range to operate the disclosed light-emitting ECDs.

The light-emissive materials do or do not chemically react with the components of the disclosed light-emitting ECD when mixed with them. In some embodiments, the light-emissive materials react with the components of the disclosed light-emitting ECD when mixed with them. In some embodiments, the light-emissive materials do not react with the components of the disclosed light-emitting ECD when mixed with them.

The light-emissive materials can be used in an amount of about 0.0001% to 99% by weight based on the combined weight fluorescent and the mixing matrixes (for example, including the electrochromic material, the electrolyte, and the ion storage materials). In some embodiments, the amount of light-emissive material is 0.01% to 99% by weight. In some embodiments, the amount of light-emissive material is 0.01% to 90% by weight. In some embodiments, the amount of light-emissive material is 0.1% to 99% by weight. In some embodiments, the amount of light-emissive material is 0.1% to 90% by weight. In some embodiments, the amount of light-emissive material is 0.1% to 50% by weight.

The disclosed light-emitting ECD comprises at least a first transparent electrode, an electrochromic layer, an electrolyte layer, an ion storage layer, and a second transparent electrode. Other than the electrodes, other components mentioned immediately above of the disclosed light-emitting ECD (electrochromic layer, electrolyte layer, and ion storage layer) can be in a solid state, or liquid state, or gel state. In some embodiments, the components mentioned immediately above of the disclosed light-emitting ECD (electrochromic layer, electrolyte layer, and ion storage layer) are in a solid state. In some embodiments, the components mentioned immediately above of the disclosed light-emitting ECD are in a gel state. In some embodiments, the components mentioned immediately above of the disclosed light-emitting ECD are in a liquid state. In some embodiments, the light-emissive materials are mixed with electrochromic materials and deposited as the electrochromic layer in a liquid state, the ion storage layer is in a solid state, and the electrolyte is in a solid state. In some embodiments, the light-emissive materials are mixed with ion storage materials and deposited as the ion storage layer in a liquid state, the electrochromic layer is in a solid state, and the electrolyte is in a solid state. In some embodiments, the light-emissive materials are mixed with electrolyte materials and deposited as the electrolyte layer in a solid state, the ion storage layer is in a solid state, and the electrochromic layer is in a liquid state.

The approaches to achieve the desired colors and switching function of the disclosed ECDs involve mixing the light-emissive material with ECDs components or introducing the light-emissive unit onto an electrochromic polymer structure.

In some embodiments, the light-emissive material is mixed with at least one of the ECDs components, for example, including an EC material, or an electrolyte material of the electrolyte layer, or an ion storage material of the ion storage layer or an electrode and disposed between the first transparent electrode and the second transparent electrode, or disposed externally to space between the first transparent electrode and the second transparent electrode. In some embodiments, the light-emissive materials are mixed with one of the electrochromic materials, the electrolyte materials, or the ion storage materials or the electrodes and displaced between the first transparent electrode and the second transparent electrode. In some embodiments, the light-emissive materials are mixed with two of the electrochromic materials, the electrolyte materials or the ion storage materials or the electrodes, and disposed between the first transparent electrode and the second transparent electrode. In some embodiments, the light-emissive materials are mixed with three of the electrochromic materials, or the electrolyte materials, or the ion storage materials or the electrodes, and displaced between the first transparent electrode and the second transparent electrode. In some embodiments, the light-emissive materials are mixed with four of the electrochromic materials, or the electrolyte materials, or the ion storage materials or the electrodes, and displaced between the first transparent electrode and the second transparent electrode. In some embodiments, the light-emissive materials are mixed with all five of the electrochromic materials, or the electrolyte materials, or the ion storage materials or the electrodes, and displaced between the first transparent electrode and the second transparent electrode. In some embodiments, the light-emissive materials are displaced externally to space between the first transparent electrode and the second transparent electrode, as shown in FIG. 1, according to an example embodiment of an all-solid ECD design. The example ECD 100 includes an electrochromic layer 110, an electrolyte layer 120, and an ion storage layer 130 deposited in between a first transparent electrode 140-1 and a second transparent electrode 140-2, and a light-emitting layer 150. The light-emitting layer 150 includes at least one light-emissive material deposited externally to space between the first transparent electrode 140-1 and the second transparent electrode 140-2. In some embodiments, additionally or alternatively, the at least one light-emissive material may be disposed in any of the layers of the ECD 100. The ECD 100 also includes a power supply 160 connected to the first transparent electrode 140-1 and the second transparent electrode 140-2.

In some embodiments, the EC materials are electrochromic polymers, and the light-emissive material is incorporated onto the electrochromic polymer by a non-conjugated bond. The non-conjugated chemical bonds may include, for example, alkyl chains, ether chains, ester chains, amide chains, or disulfide bonds. Due to the non-conjugated bonding, the introduced light-emissive material would insignificantly affect the electrochromic properties of the electrochromic materials. In some embodiments, the light-emissive material does not undergo redox processes within the potential window for operation of the electrochromic device and does not chemically react with the electrochromic material.

What is claimed is:

1. A light-emitting electrochromic device, comprising:
   a first transparent electrode;
   an electrochromic layer;
   an electrolyte layer;
   an ion storage layer; and
   a second transparent electrode;
   wherein:
   the electrochromic layer includes at least one electrochromic material that generates a subtractive color and switches from a colored state to a transmissive bleached state;
   the electrochromic layer is disposed between the first transparent electrode and the second transparent electrode;
   at least one light-emissive material is included in the light-emitting electrochromic device, generates an additive color, and emits light when the electrochromic material is either in the colored state or in the bleached state or in both of the colored state and the bleached state;
   the at least one light-emissive material is disposed externally to space between the first transparent electrode and the second transparent electrode;
   the electrochromic material and the light-emissive material produce a color mixing; and
   the light-emitting electrochromic device further comprises a multiple light switching mechanism comprising:
   an electrochromic color switching of the electrochromic material between the colored state and the bleached state;
   an on-switching of an emissive color triggered by excitation sources of the light-emissive material; and
   an off-switching of at least another one emissive color controlled by quenching the light-emissive material.

2. The light-emitting electrochromic device in claim 1, wherein the emissive colors are fluorescent or phosphorescent.

3. The light-emitting electrochromic device in claim 1, wherein the emissive colors are trigged by ambient light or an electrical field.

4. The light-emitting electrochromic device in claim 1, wherein the electrochromic material is an electrochromic polymer.

5. A light-emitting electrochromic device, comprising:
   a first transparent electrode;
   an electrochromic layer;
   an electrolyte layer;
   an ion storage layer; and
   a second transparent electrode;
   wherein:
   the electrochromic layer includes at least one electrochromic material that generates a subtractive color and switches from a colored state to a transmissive bleached state;
   the electrochromic layer is disposed between the first transparent electrode and the second transparent electrode;
   at least one light-emissive material is included in the light-emitting electrochromic device, generates an additive color, and emits light when the electrochromic material is either in the colored state or in the bleached state or in both of the colored state and the bleached state;
   the at least one light-emissive material is excited to emit light by one or more of chemical switching, electric switching, sound switching, friction switching, heat switching, biological switching, and aggregation-induced switching;
   the electrochromic material and the light-emissive material produce a color mixing; and
   the light-emitting electrochromic device further comprises a multiple light switching mechanism comprising:
   an electrochromic color switching of the electrochromic material between the colored state and the bleached state;
   an on-switching of an emissive color triggered by excitation sources of the light-emissive material; and
   an off-switching of at least another one emissive color controlled by quenching the light-emissive material.

6. The light-emitting electrochromic device in claim 5, wherein the emissive colors are fluorescent or phosphorescent.

7. The light-emitting electrochromic device in claim 5, wherein the light-emissive material is:
   mixed with at least one of the electrochromic material, or an electrolyte material of the electrolyte layer, or an ion storage material of the ion storage layer, or the electrodes and disposed between the first transparent electrode and the second transparent electrode; or
   disposed externally to space between the first transparent electrode and the second transparent electrode.

8. The light-emitting electrochromic device in claim 5, wherein the electrochromic material is an electrochromic polymer.

9. The light-emitting electrochromic device in claim 8, wherein the light-emissive material is incorporated onto the electrochromic polymer by a non-conjugated bond.

* * * * *